United States Patent
Fujita

(10) Patent No.: US 9,699,350 B2
(45) Date of Patent: Jul. 4, 2017

(54) COMMUNICATION DEVICE SUPPRESSING OCCURRENCE OF COMMUNICATION DISTURBANCE

(71) Applicant: KYOCERA Document Solutions Inc., Osaka (JP)

(72) Inventor: Hiroyuki Fujita, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/254,188

(22) Filed: Sep. 1, 2016

(65) Prior Publication Data

US 2017/0064136 A1  Mar. 2, 2017

(30) Foreign Application Priority Data

Sep. 2, 2015 (JP) .................. 2015-173066

(51) Int. Cl.
*H04M 11/00* (2006.01)
*H04N 1/327* (2006.01)

(52) U.S. Cl.
CPC ....... *H04N 1/32713* (2013.01); *H04N 1/3273* (2013.01); *H04N 1/32741* (2013.01); *H04N 2201/0094* (2013.01); *H04N 2201/3278* (2013.01); *H04Q 2213/179* (2013.01)

(58) Field of Classification Search
CPC ............. H04N 1/32713; H04N 1/3273; H04N 1/32741; H04N 2201/3278; H04N 2201/0094; H04Q 2213/179
See application file for complete search history.

(56) References Cited

U.S. PATENT DOCUMENTS

2014/0043637 A1* 2/2014 Mori ............... G06K 15/406
                                                    358/1.13
2015/0092469 A1* 4/2015 Kim ............... G11C 11/1673
                                                    365/148

FOREIGN PATENT DOCUMENTS

JP  2010-141734 A  6/2010
JP  2013-165464 A  8/2013

* cited by examiner

*Primary Examiner* — Stella Woo
(74) *Attorney, Agent, or Firm* — IP Business Solutions, LLC

(57) ABSTRACT

A communication device includes: a communication control section; a variable resistor; a voltage detecting section; and a resistance value adjusting section. The communication control section performs control necessary for facsimile communication. The variable resistor is arranged between two line-connecting terminals, each of the line-connecting terminals is for connecting a telephone line. The voltage detecting section detects a line voltage of the telephone line to which the variable resistor is connected under closed state of the telephone line. The resistance value adjusting section changes a resistance value of the variable resistor. When the changed resistance value of the variable resistor becomes a standard resistance value to be a voltage value where the line voltage detected by the voltage detecting section is capable of the facsimile communication, the resistance value adjusting section sets the resistance value of the variable resistor to a resistance value for the facsimile communication.

5 Claims, 4 Drawing Sheets

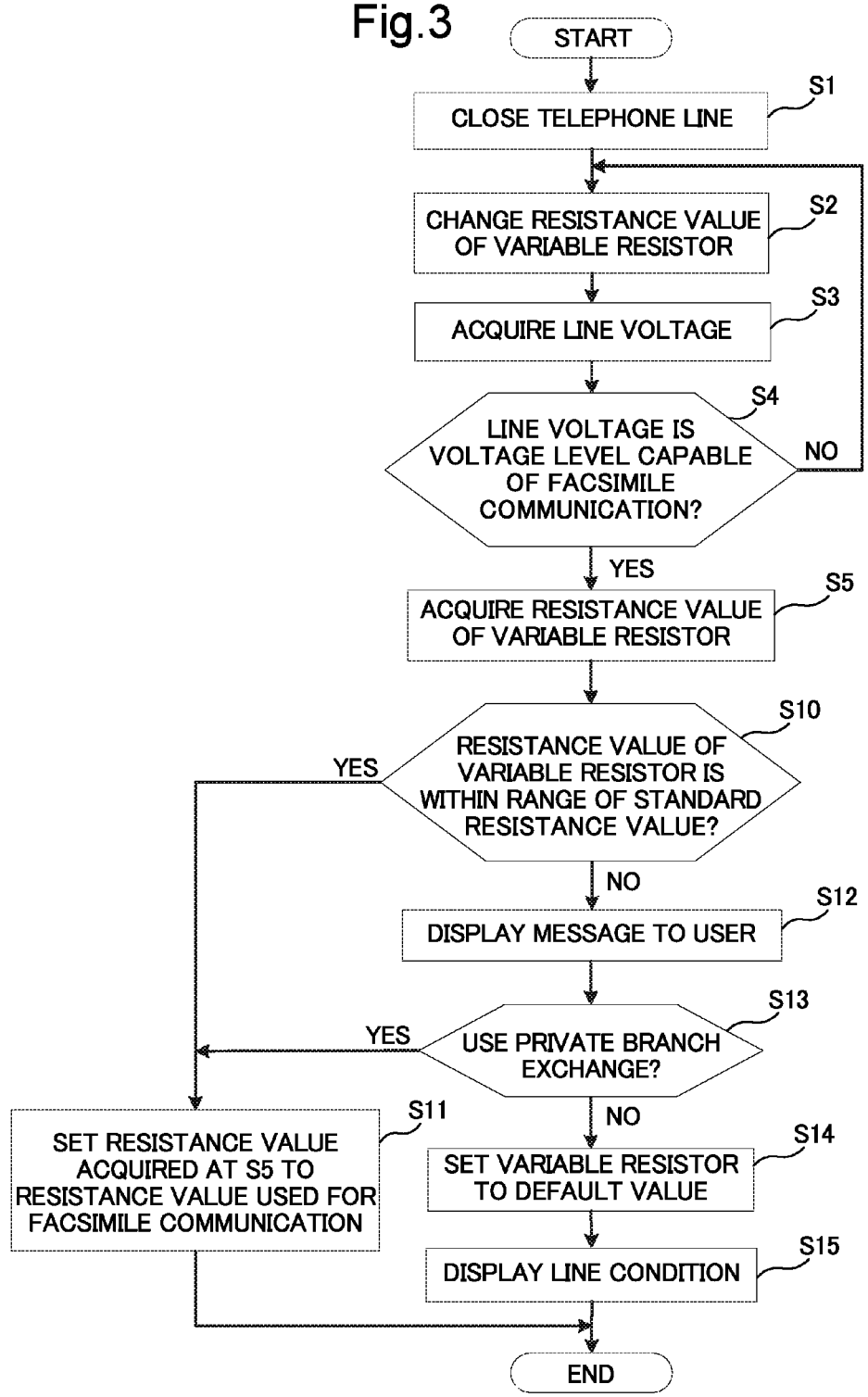

COMMUNICATION DEVICE SUPPRESSING OCCURRENCE OF COMMUNICATION DISTURBANCE

INCORPORATION BY REFERENCE

This application claims priority to Japanese Patent Application No. 2015-173066 filed on Sep. 2, 2015, the entire contents of which are incorporated by reference herein.

BACKGROUND

The present disclosure relates to communication devices and particularly relates to a technique of reducing influence of noise and the like and suppressing occurrence of a communication disturbance.

A switchboard that interconnects telephone lines and forms a telephone network is generally conforming to a telephone line standard. In recent years, however, deterioration in telephone line infrastructures or applications of low-cost switchboards have caused line environments where the telephone line standard is close to the limit or the telephone line standard is un-satisfied. For example, even if a supply current from a switchboard is regulated as 20 mA (milliampere) and up, there are some switchboards incapable of supplying 20 mA and up, and other switchboards that activate protection circuits to suppress the flow of the current when the current becomes close to 20 mA. One of the causes for such environment is that data transmission and reception have been made possible by a great variety of communication means such as cell phones or mobile devices, and thereby causing neglect of maintenance of the telephone line infrastructures.

Also as for a communication device such as a facsimile device connected to a telephone line to be used is designed and controlled based on the telephone line standard, so that when a telephone network including a switchboard becomes close to the standard limit or is not satisfying the standard, there are risks of not being able to communicate normally for being sensitive to influence of on-the-line noise and the like.

With respect to the example above, if the supply current from the switchboard is below 20 mA, i.e. if a power supply capacity of the telephone line is low, a voltage level of a signal which the communication device receives becomes low, thereby becoming sensitive to the influence of on-the-line noise. A technique to suppress the occurrence of communication error caused by the influence of noise and the like has been proposed.

SUMMARY

A technique improved over the aforementioned technique is proposed as one aspect of the present disclosure.

A communication device according to one aspect of the present disclosure includes a communication control section, a variable resistor, a voltage detecting section, and a resistance value adjusting section.

The communication control section performs control necessary for facsimile communication.

The variable resistor is arranged between two line-connecting terminals, and each of the line-connecting terminals is for connecting a telephone line.

The voltage detecting section detects a line voltage of the telephone line to which the variable resistor is connected, under closed state of the telephone line.

The resistance value adjusting section changes a resistance value of the variable resistor.

Furthermore, when the changed resistance value of the variable resistor becomes a resistance value to be a predetermined standard voltage value in which the line voltage detected by the voltage detecting section is capable of the facsimile communication, the resistance value adjusting section sets the resistance value of the variable resistor to a resistance value for the facsimile communication.

BRIEF DESCRIPTION OF THE DRAWINGS

FIG. 3 shows an example of a processing operation of the control unit.

DETAILED DESCRIPTION

Figure 1:
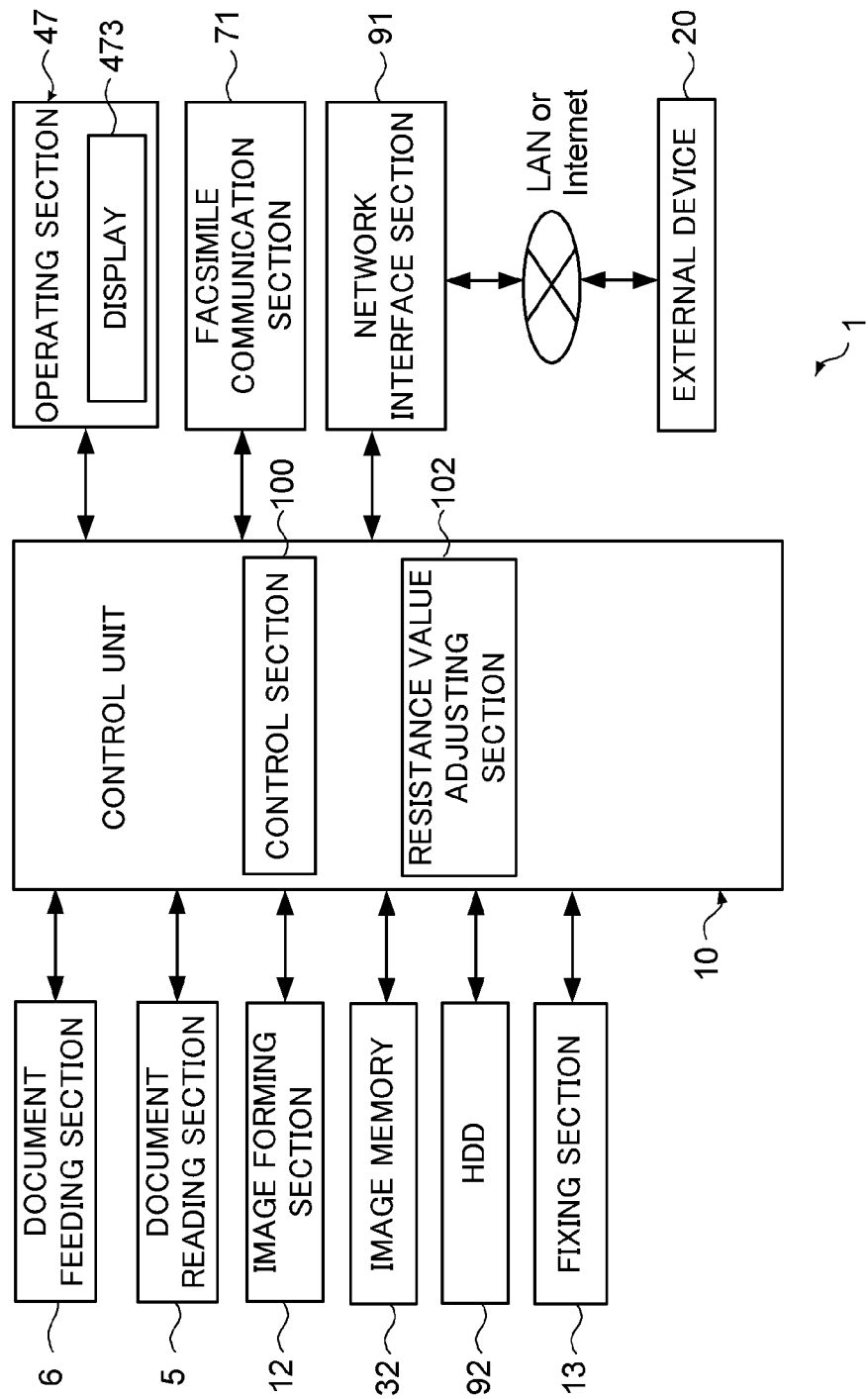
FIG. 1 is a functional block diagram schematically showing an essential internal configuration of an image forming apparatus as a communication device according to a first embodiment of the disclosure.

Hereinafter, a description will be given of a communication device according to one embodiment of the present disclosure with reference to the drawings. FIG. 1 is a functional block diagram schematically showing an essential internal configuration of an image forming apparatus as a communication device according to a first embodiment of the disclosure. An image forming apparatus 1 is a multi-function peripheral having multiple functions including, for example, a copy function, a print function, a scan function, and a facsimile function, and is made up by including a control unit 10, a document feeding section 6, a document reading section 5, an image forming section 12, an image memory 32, an HDD (hard disk drive) 92, a fixing section 13, an operating section 47, a facsimile communication section 71, and a network interface section 91.

The document feeding section 6 feeds an original document to be read to the document reading section 5.

Under control of a control section 100 that configures the control unit 10, the document reading section 5 includes unillustrated reading mechanism having a light irradiation section and a CCD (charge coupled device) sensor and so on. The document reading section 5 irradiates the original document by using the light irradiation section and receives the light reflected therefrom with the CCD sensor, thereby reading an image from the original document.

The image forming section 12 forms a toner image onto a paper sheet to which the toner image is printed.

The image memory 32 is an area where image data of the original document read by the document reading section 5 are temporarily stored, and where data to be printed by the image forming section 12 are temporarily saved.

The HDD 92 is a large capacity storage storing images of the original document and so on read by the document reading section 5.

The fixing section 13 fixes the toner image formed on the paper sheet onto the paper sheet by the application of heat and pressure.

The operating section 47 accepts operator's instructions for various types of operation and processing executable on the image forming apparatus 1, such as an instruction to perform an image forming operation and an instruction to perform a document reading operation. The operating section 47 includes a display 473 that displays operation guidance and so on for the operator. The display 473 is of a touch panel. The operator can operate the image forming apparatus 1 by touching buttons and keys displayed thereon.

The facsimile communication section 71 includes unillustrated sections, such as a coding/decoding section, a modulation-demodulation section, and a network control section, and performs facsimile communication using a public telephone network.

The network interface section 91 is made up by including a communication module, such as a LAN (local area network) board, and sends and receives various data to and from an external device 20, for example a personal computer within a local area or on the Internet, via the LAN connected to the network interface section 91.

The control unit 10 is made up by including a CPU (central processing unit), a RAM (random access memory), a ROM (read only memory), and a dedicated hardware circuit. The control unit 10 includes the control section 100 that governs the overall control of the image forming apparatus 1 and a resistance value adjusting section 102.

The control unit 10 functions as the control section 100 and the resistance value adjusting section 102 based on operation according to a control program installed in the HDD 92. The control section 100 and the resistance value adjusting section 102, however, can be structured by a hardware circuit respectively, and not based on the operation according to the control program by the control unit 10. The same is applied to each of the embodiments hereinafter, unless otherwise specified.

The control section 100 is connected to the document feeding section 6, the document reading section 5, the image forming section 12, the image memory 32, the HDD 92, the fixing section 13, the operating section 47, the facsimile communication section 71, and network interface section 91, and controls each of the sections. The resistance value adjusting section 102 will be explained in detailed later on with reference to FIG. 2.

Figure 2:
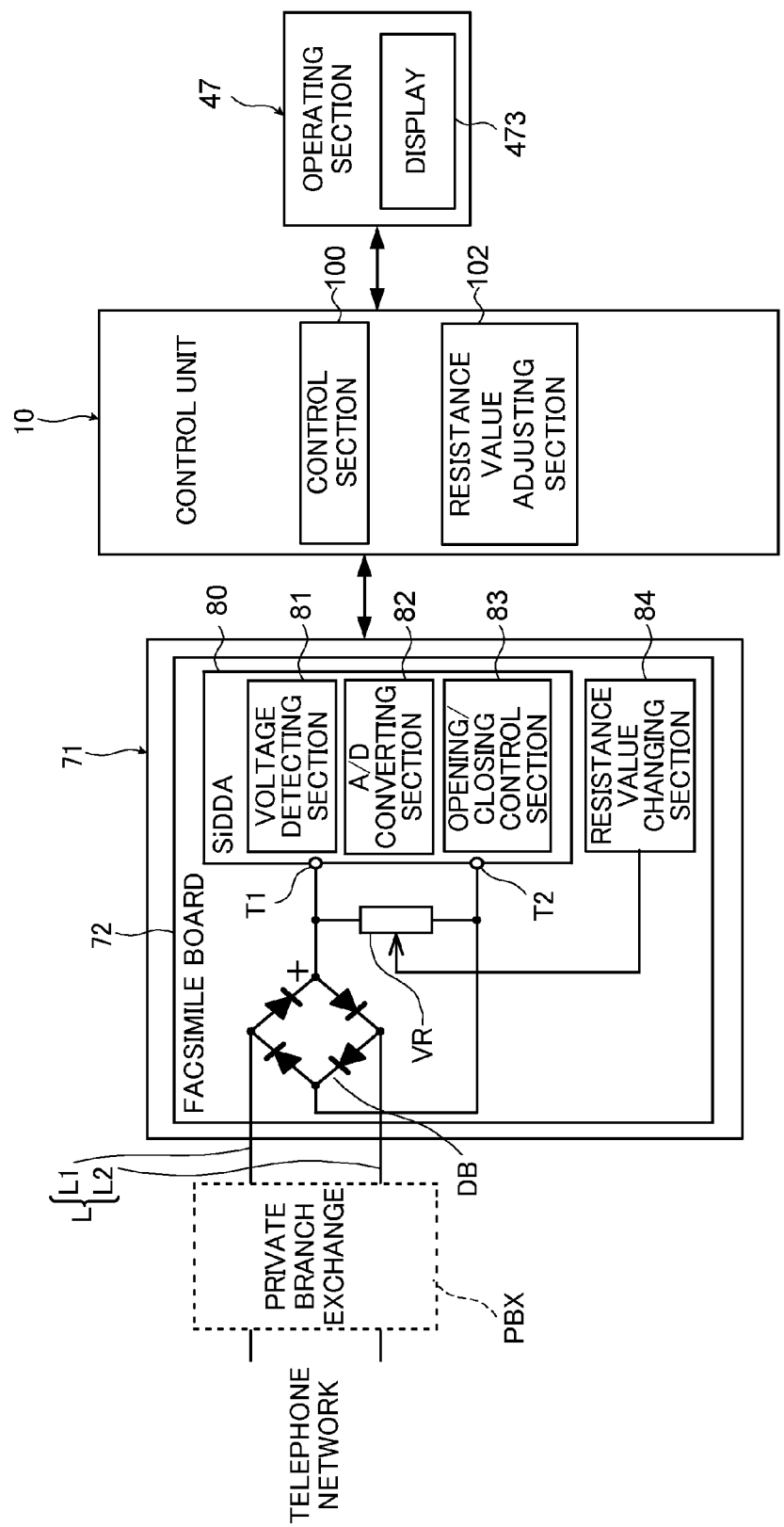
FIG. 2 is a functional block diagram schematically showing an essential internal configuration of a facsimile communication section and a control unit.

FIG. 2 is a functional block diagram schematically showing an essential internal configuration of the facsimile communication section 71 and the control unit 10.

The facsimile communication section 71 is made up by including a facsimile board 72 having a silicon DAA (data access arrangement) 80, and a telephone line L of a two wire system made up with two communication lines 11 and 12. The facsimile board 72 includes a diode bridge DB that rectifies voltage from the telephone line L. The voltage rectified by the diode bridge DB is inputted to line-connecting terminals T1 and T2 arranged at the silicon DAA 80. The facsimile board 72 is provided with a variable resistor VR arranged between the line-connecting terminal T1 and the line-connecting terminal T2, and with a resistance value changing section 84 that changes the resistance value of the variable resistor VR.

The silicon DAA 80 performs control necessary for the facsimile communication. The silicon DAA 80 includes, a voltage detecting section 81 that detects the voltage (line voltage E) between the line-connecting terminal T1 and the line-connecting terminal T2, an A/D converting section 82 that is capable of analog/digital conversion of the line voltage E detected by the voltage detecting section 81, and an open/close control section 83 that controls opening and closing of the telephone line L.

The resistance value adjusting section 102 changes the resistance value of the variable resistor VR. The resistance value adjusting section 102 adjusts the variable resistor VR with the resistance value changing section 84 so that the line voltage E becomes the voltage level with which the facsimile communication section 71 is capable of normal communication.

A description will be given of a processing operation performed by the control unit 10 based on the flowchart shown in FIG. 3. When the facsimile communication section 71 is active, the processing operation described hereunder is performed.

First, the control section 100 closes the telephone line L by controlling the open/close control section 83 of the facsimile communication section 71 (S1). When the telephone line L is closed, a loop is formed on the telephone line L and an electric current flows thereon (a call signal). Here, the resistance value of the variable resistor VR used for the facsimile communication by the facsimile communication section 71 is set at the default value, i.e., the resistance value having been previously used for the facsimile communication.

Although it is not particularly shown in FIGS, in a case where the resistance value adjusting section 102 determines at this point that the line voltage E is the voltage value capable of the facsimile communication, all the processes after S2 will be unperformed. The resistance value adjusting section 102 makes this determination based on a digital signal indicating the line voltage E which has been detected by the voltage detecting section 81 and outputted from the A/D converting section 82 of the facsimile communication section 71. Only in a case where the resistance value adjusting section 102 determines that the line voltage E is not the voltage value capable of the facsimile communication, the processes after S2 are performed.

Under the closed state of the telephone line L, the resistance value adjusting section 102 changes the resistance value of the variable resistor VR by controlling the resistance value changing section 84 of the facsimile communication section 71 (S2). Here, the resistance value adjusting section 102 firstly lowers the resistance value of the variable resistor VR to the predetermined value.

Following the above process, the resistance value adjusting section 102 acquires the digital signal indicating the line voltage E which has been detected by the voltage detecting section 81 and outputted from the A/D converting section 82 of the facsimile communication section 71 (S3). The resistance value adjusting section 102 determines, based on the acquired digital signal, whether or not the line voltage E has been changed to the predetermined standard voltage value capable of the normal facsimile communication (S4).

In a case where the resistance value adjusting section 102 determines that the line voltage E has not been changed to the predetermined standard voltage value capable of the facsimile communication (NO in S4), the process is back to S2 and the resistance value adjusting section 102 further lowers the resistance value of the variable resistor VR.

In a case where the resistance value adjusting section 102 determines that the line voltage E has been changed to the predetermined standard voltage value capable of the facsimile communication (YES in S4), the resistance value adjusting section 102 acquires the resistance value R1 of the variable resistor VR outputted at this point from the resistance value changing section 84 (the digital signal converted by the A/D converting section 82) (S5).

Next, the resistance value adjusting section 102 determines whether or not the resistance value R1 of the variable resistor VR acquired at S5 is within the range of a standard resistance value R_STD (at 300Ω and lower, for example) (S10). If the resistance value adjusting section 102 determines that the resistance value R1 is within the range of the standard resistance value R_STD (YES in S10), the resistance value adjusting section 102 sets the resistance value R1 to the resistance value of the variable resistor VR used for the facsimile communication by the facsimile communication section 71 (S11). Even in a case where the line voltage E is not the enough level for the facsimile communication and where the current value at this time is not reached to the standard current value I_STD, the line voltage E and the current value corresponding thereto can be increased by this process to the level capable of normal facsimile reception at the facsimile communication section 71 when the telephone line is closed at the facsimile communication section 71 of the image forming apparatus 1.

Figure 4A:
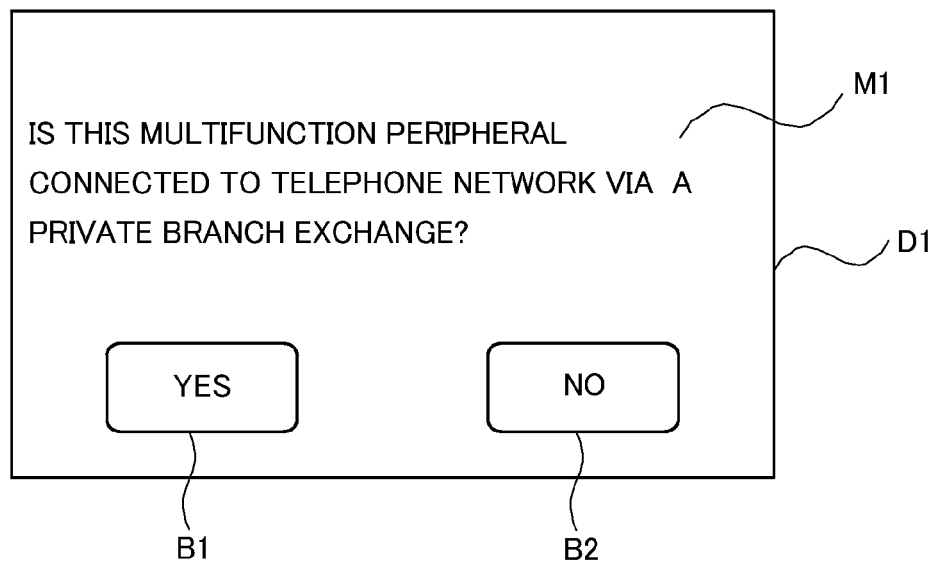
FIGS. 4A and 4B each shows an example of a display screen.

In contrast, in a case where the resistance value adjusting section 102 determines that the resistance value R1 is not within the range of the standard resistance value R_STD (NO in S10), the control section 100 allows the display 473 to display a display screen D1 including a message M1 "IS THIS MULTIFUNCTION PERIPHERAL CONNECTED TO TELEPHONE NETWORK VIA A PRIVATE BRANCH EXCHANGE?" as shown in FIG. 4A (S12).

Other than the message M1, the display screen D1 is formed with a button B1 indicating "YES" and a button B2 indicating "NO". Thus, by replying M1, the message prompting the confirmation on whether or not the facsimile communication section 71 (the image forming apparatus 1) is connected to the telephone network via the private branch exchange PBX is reported to the user. The user enters the reply to the M1, about whether or not the facsimile communication section 71 (the image forming apparatus 1) is connected to the telephone network via the private branch exchange PBX, by operating the operating section 47 (using the touch panel function of the display 473).

The resistance value adjusting section 102 determines whether the reply from the user is "using the private branch exchange PBX" (S13). In a case where, for example, the user selects the "YES" button B1 and enters the reply that the facsimile communication section 71 is connected to the private branch exchange PBX via the telephone network using the touch panel function into the operating section 47, thereby the resistance value adjusting section 102 determines that the reply from the user is "using the private branch exchange PBX" (YES in S13), the resistance value adjusting section 102 sets the resistance value R1 (the resistance value VR of the variable resistor R1 acquired at S5) to the resistance value of the variable resistor VR used for the facsimile communication by the facsimile communication section 71 (S11).

In contrast, in a case where, for example, the user selects the "NO" button B2 and enters the reply that the facsimile communication section 71 is not connected to the private branch exchange PBX via the telephone network using the touch panel function into the operating section 47, thereby the resistance value adjusting section 102 determines that the reply from the user is not "using the private branch exchange PBX" (NO in S13), the resistance value adjusting section 102 sets the resistance value of the variable resistor VR used for the facsimile communication by the facsimile communication section 71 to the default value (S14). This is because in a case where the facsimile communication section 71 is directly connected to the telephone network without the private branch exchange PBX in between, the resistance value adjusting section 102 must adjust the resistance value of the variable resistor VR within the range of standard resistance value R_STD.

Figure 4B:
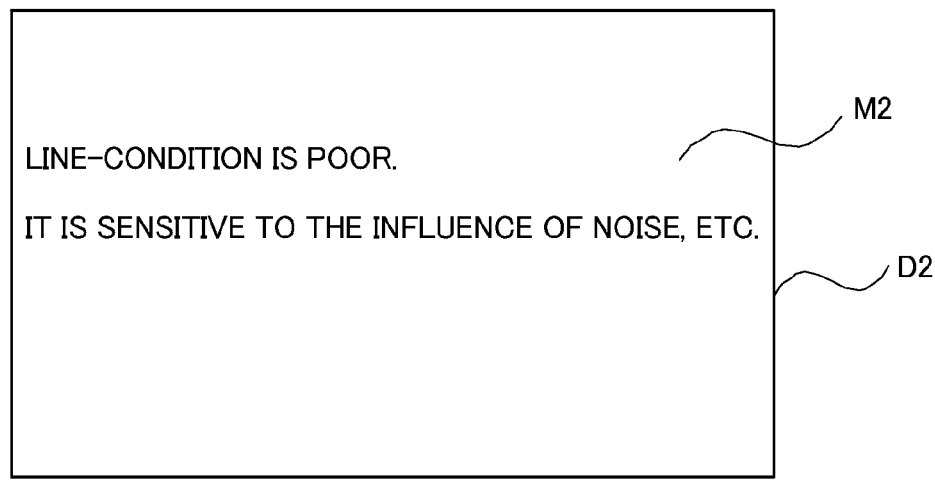

Following to the above process, the control section 100 allows the display 473 to display a display screen D2 including a message M2 "LINE CONDITION IS POOR. IT IS SENSITIVE TO THE INFLUENCE OF NOISE, ETC." as shown in FIG. 4B (S15). Thus, the poor condition of the facsimile communication is reported to the user. The display 473 exemplifies the reporting section in What is claimed is in the disclosure.

As thus far described, according to the embodiment, the resistance value of the variable resistor VR is adjusted so that the line voltage E of the facsimile communication section 71 becomes the voltage level capable of the normal facsimile communication. Accordingly, even in a case with a line environment where the telephone line standard is close to the limit or the telephone line standard is un-satisfied and with the supply current at the facsimile communication is below the standard value, the resistance value of the variable resistor VR can be adjusted and a power supply capability of the telephone line L can be improved. Thus, the standard value can be hold as the supply current value at the facsimile communication, thereby being capable of suppressing occurrence of communication disturbance.

The present disclosure should not be limited to the configurations described in the embodiment but various modifications are applicable. Although the description of the above embodiment is given taking an image forming apparatus of a multifunction peripheral, as an example of the communication device according to the present disclosure, the example is merely illustrative and the image forming apparatus may be any other image forming apparatus, including other electronic devices having, for example, a facsimile function.

The structures, configurations, and processing of the embodiment described with reference to FIGS. 1 to 4B are merely illustrative of one embodiment of the present disclosure and the present disclosure is not intended to be limited to the above structures, configurations, and processing.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A communication device comprising:
   a communication control section that performs control necessary for facsimile communication;
   a variable resistor that is arranged between two line-connecting terminals, each of the line-connecting terminals being for connecting a telephone line;
   a voltage detecting section that detects a line voltage of the telephone line to which the variable resistor is connected, under closed state of the telephone line; and
   a resistance value adjusting section that changes a resistance value of the variable resistor,
   wherein when the changed resistance value of the variable resistor becomes a resistance value to be a predetermined standard voltage value in which the line voltage detected by the voltage detecting section is capable of the facsimile communication, the resistance value adjusting section sets the resistance value of the variable resistor to a resistance value for the facsimile communication,
   the communication device further comprises:
   a reporting section; and
   a control section that allows the reporting section, in a case where the changed resistance value of the variable resistor is greater than the predetermined standard resistance value, to report a message that prompts a user to enter a reply about whether or not the communication device is connected to a telephone network via a private branch exchange, wherein when the resistance value of the variable resistor is greater than the predetermined standard resistance value, in a case where the resistance value adjusting section receives from the user the reply that the communication device is connected to the telephone network via the private branch exchange, the resistance value adjusting section sets the resistance value of the variable resistor to the resistance value for the facsimile communication, and in a case where the resistance value adjusting section does not receive the reply that the communication device is connected to the telephone network via the private branch exchange, the resistance value adjusting section sets a predetermined default resistance value, but not the resistance value of the variable resistor, to the resistance value for the facsimile communication.

2. The communication device according to claim 1, wherein only in determining that the line voltage is not the predetermined standard voltage value, the resistance value adjusting section performs a setting processing of the resistance value for the facsimile communication.

3. The communication device according to claim 1, wherein in performing the setting processing of the resistance value for the facsimile communication, the resistance value adjusting section reduces the resistance value of the variable resistor stepwise.

4. The communication device according to claim 1, wherein in a case where the changed resistance value of the variable resistor is within a range of a predetermined standard resistance value, the resistance value adjusting section sets the resistance value of the variable resistor to the resistance value for the facsimile communication.

5. The communication device according to claim 1, wherein when the reply that the communication device is connected to the telephone network via the private branch exchange is not received and the resistance value adjusting section does not set the resistance value of the variable resistor to the resistance value for the facsimile communication, the control section allows the reporting section to report a poor facsimile communication condition.

* * * * *